United States Patent

Tixier

[15] 3,673,837

[45] July 4, 1972

[54] METHODS AND TOOLS FOR FINISHING GEAR TEETH BY ROLLING

[72] Inventor: Michel Tixier, Billancourt, France

[73] Assignees: Regie Nationale Des Usines Renault, Billancourt; Automobiles Peugeot, Paris, France

[22] Filed: June 15, 1970

[21] Appl. No.: 46,036

[52] U.S. Cl............................................72/102, 29/159.2
[51] Int. Cl.....................................................B21h 5/00
[58] Field of Search..........................72/102, 107, 108, 366; 29/159.2

[56] References Cited

UNITED STATES PATENTS

| | | | |
|---|---|---|---|
| 1,642,179 | 9/1927 | Schurr | 29/159.2 |
| 2,362,787 | 11/1944 | Williamson | 90/1.6 |
| 1,712,095 | 5/1929 | Schurr | 29/159.2 |
| 1,001,799 | 8/1911 | Anderson | 72/102 |
| 3,353,392 | 11/1967 | Anthony et al. | 72/110 |

*Primary Examiner*—Lowell A. Larson
*Attorney*—Stevens, Davis, Miller & Mosher

[57] ABSTRACT

In this method of finishing teeth by rolling, notably gear teeth, the rolling operation known per se of the working surfaces of the teeth is completed by a gauging operation of the inoperative surfaces, that is, those not brought into mutual contact during the gear operation, said gauging operation consisting for example of a flattening of the ridges of the surface unevenness of the rough surface resulting from the milling cutting operation, or a simple contact or an absence of contact, as a function of machining tolerances alone, this method being applicable to the finishing of mass-produced gears, notably in the automotive industry.

4 Claims, 7 Drawing Figures

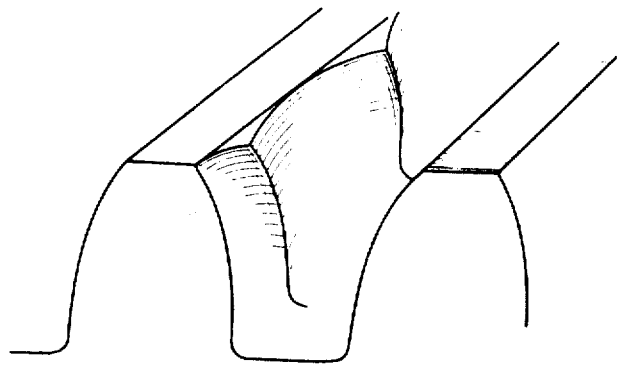
Fig-1
Fig-2
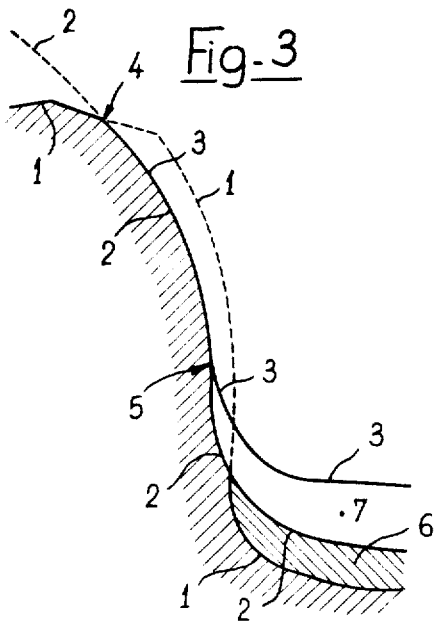
Fig-3
Fig-4

METHODS AND TOOLS FOR FINISHING GEAR TEETH BY ROLLING

The present invention relates to gear teeth finishing, that is, the technique of finishing gear teeth to accurate size and tooth shape with suitable bearing surface and finish after cutting, by resorting to a so-called pressure rolling method in which hard-surfaced wheels or roller tools are used. This invention is also concerned with a tool or wheel intended for carrying out this method.

As a rule, the teeth of gears utilized in mechanical industries are cut by milling. Now the surfaces and the poor accuracy of the gear teeth thus obtained make it necessary to perform a complementary finishing operation such as grinding, shaving, burnishing or lapping. However, cold-rolling techniques have also been used to this end.

Now, due to the specific nature of this last type of machining operation, in which no material is removed, the projecting ridges or excess material being simply "shifted" or forced to a flat condition by plastic distortion, it is scarcely possible to admit any interference between the gear and the rolling tool without providing an adjacent compensating gap therebetween to permit an escape of the extruded or driven material.

Under these conditions these finishing processes require, in the rolling treatment of the working outlines of the teeth, a root or bottom clearance sufficient to accommodate:

the metal extruded as a consequence of the teeth rolling operation, any dimensional variations resulting from the machining tolerances usually reserved for the initial milling cutting operation, and the necessary root clearance of the train of gears under normal operating conditions.

This root clearance must therefore be sufficient to cope with all these possibilities of variations without any risk of teeth clash or interferences. As a result, the working depth of the teeth is increased and this constitutes an obvious cause of weakening, so that the gears must be over-sized in order to meet normal operating strength requirements in the present state of the gear technique.

The reduction in the initial milling cutting tolerances, which is obtained by virtue of substantial improvements in the gear teeth milling techniques, as taught inter alia in other patent applications filed by the same Applicant has permitted the finishing by rolling of gear teeth according to the method of the present invention without resorting to preliminary shaving or grinding operations.

The method according to this invention consists in completing the operation, already known per se, of rolling the working surfaces of the gear teeth, with an operation consisting in gauging the inoperative surfaces, that is, the surfaces which are not brought into mutual meshing contact during the gear operation, this gauging operation consisting for example in flattening the ribs or ridges constituting the surface unevennesses resulting from the rough milling cutting operation, or a simple contact or a pass without any contact, as a function of the machining tolerance alone, the rolling finishing tool being shaped as a function of the outline of the path followed by the conjugate teeth during actual service conditions.

Thus, while eliminating any risk of subsequent teeth interference, the combination of rolling and gauging treatment of gear teeth according to this invention permits of reducing considerably the discrepancy between the tooth outline rough-cutting shape before the finishing operation and the trajectory of the finishing tool to the sole machining tolerance of the rough-cutting machine.

The reduction in the teeth root clearance to this only value plus the necessary service or operating clearance, compared with the minimum clearances, of the order of one-fourth of the diametral pitch of the gear teeth, contemplated for avoiding any risk of interference, will thus ensure a considerable improvement in the teeth strength which, for an equivalent stress, leads to a dimensional reduction of the gears themselves.

The advantages inherent to the rolling finishing technique, concerning notably the operating time, the surface condition and regularity of the resulting outlines, are complemented by the savings obtained in comparison with, say, a shaving operation as currently used in teeth finishing technique, which were heretofore applied for completing the side-face milling-cutting operation and are advantageously replaced by the above-defined gauging operation since it reinforces the teeth strength.

It is another object of this invention to determine the structure of a rolling wheel for properly performing both the rolling of the working surfaces and the gauging of the inoperative surfaces at the teeth roots, said wheel being necessarily obtained as the outline of a conjugate gear from the contour of the piece to be rolled. A first feature resides essentially in the extension of the rolled surface beyond the working surface where the actual meshing engagement takes place by an amount adapted to absorb possible variations in said surface so as to give the certainty that in all operating conditions the gear or pinion concerned and its conjugate gear or pinion will engage each other only through a surface having undergone the rolling operation, this amount being referred to hereinafter as the operating interference absorption play, another feature characteristic of this invention consisting in that, since on the inoperative surfaces the dimensions resulting from the pinion teeth root gauging operation must constantly provide the play necessary for ensuring a proper operation of the gear with the conjugate pinion or gear, the wheel contour must have an outer diameter of tooth addendum which is greater than that of the outer diameter of tooth addendum of the conjugate pinion by twice the value of the operating or working clearance; thus, during its passage the wheel will roll on the side surfaces an active surface corresponding to an operation under the most severe service conditions, and will crush on the inoperative surfaces the projections or ribs left by the cutting operation which might interfere with the minimum working clearance between the gear and the conjugate gear or pinion.

Finally, in order to obtain a wheel having the longest possible useful life and at the same time minimum over-all dimensions, the number of teeth $n_2$ of the wheel will be so selected that if $n$ is the number of teeth of the workpiece there is an unequality $2n_1 < n_2 < 3n_1$, $n_1$ and $n_2$ being prime numbers to each other.

In order to afford a clearer understanding of this invention a description thereof will now be given with reference to the attached drawing, in which:

FIG. 1 illustrates diagrammatically in enlarged perspective view the surface corrugations resulting from the rough cutting of milled tooth;

FIG. 2 is a diagrammatic section view showing the flattening of the corrugations ridges of these surfaces, which results from the gauging operation;

FIG. 3 is a fragmentary section showing the side surface of a machined tooth, the different tooth contours corresponding the conventional rolling operation;

FIG. 4 is a view similar to FIG. 3 but showing on a machined tooth side the tooth contours corresponding to the rolling and gauging operation according to this invention;

Figure 5:
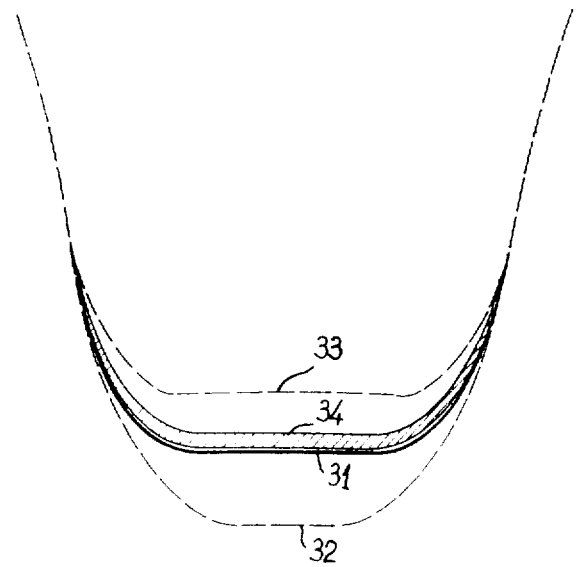
FIG. 5 shows at scale 1/1, comparatively, the tooth contour obtained by actual technical means and according to the method of this invention.

Referring firstly to FIG. 3, the tooth contour 1 is the one obtained after the rough milling operation and before the tooth finishing operation. The contour 2 shows the path followed by the finishing shaving tool in relation to the teeth for a given tool wear.

The thick-line contour 3 designates the path of the conjugate pinion during the gear operation in relation to the teeth. The portion extending from point 4 to point 5 designates the working surface obtained during the gear operation. When machining the rough-cut contour 1, before the rolling finishing operation, notably in the case of gear finishing by shaving, this contour may vary as a consequence of tool wear and its discrepancy in relation to the finishing contour 2 may vary. Therefore, a sufficient tooth root wear-compensating clearance 6 must be provided between the aforesaid contours 1 and 2, this clearance 6 being completed by the normal operating clearance 7 between the contours 2 and 3 in order to prevent any risk of interference between the gears.

In FIG. 4 the rough-cutting contour 1, and rolling-finishing contour 2 and the contour 3 of the conjugate pinion, during actual operation, are illustrated.

The rolling zone is limited to the contour 2 extending between points 4 and 5 and extended at the tooth root by the overgauging contour 8 which may either merge with, or follow a parallel contour very close to, the corresponding outline 1.

Only the operating clearance 7 will remain at the tooth root between contours 1 and 3.

During the rolling operation the surface of the rolling pinion-tool will perform in succession a gauging of the tooth addendum or tip of the piece, by possibly crushing the ridges of any corrugations left as a consequence of the surface milling cutting, then the rolling of the working surface of the teeth (from points 4 to 5) so as to flatten and force the metal, and obtain in this zone a very smooth surface condition characteristic of rolled surfaces, followed by a gauging of the inoperative tooth root zone, according to the method of this invention.

FIG. 5 shows a teeth root clearance: the contour 31 is the one obtained according to the invention whereas the contour 32 is the one according to the prior art, 33 shows the path followed by the conjugate pinion and the area, 34 represents the space in which is realized the gauging operation, it will be seen that the clearance between 33 and 34 constitutes the operating clearance.

Figure 6:
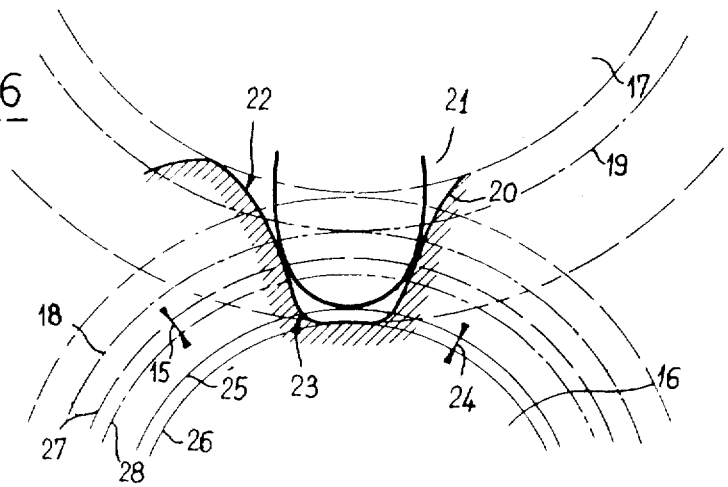
FIG. 6 is a diagram showing a gear with the conjugate pinion incorporating the basic principles of this invention.

FIG. 6 illustrates diagrammatically the pinion piece to be cut 16 with its conjugate pinion 17 in order clearly to evidence the useful dimensions necessary for determining the wheel shape corresponding to the desired result. These pinions are shown only diagrammatically by their base circles 18 and 19, the tooth outline 20 of the workpiece and the envelope outline 21 of the conjugate pinion tooth addendum.

The outline 20 comprises the working surface portion 22, that is, the one contacting the outline of the conjugate pinion, and the inoperative tooth root portion 23 which must leave a working clearance 24 of a sufficient value in relation to the outline 21, i.e. between the envelope circles of the conjugate pinion addendum outline 25 and the dedendum circle 26.

When determining the characteristics of the contour of the wheel to be used for performing the rolling-gauging operation, which acts as a pinion in a couple of gears having parallel axes, the workpiece being considered as issuing from the milling cutting operation and the conjugate outline of said wheel is determined with due consideration for the corrections corresponding to the two above-defined clearances which are to be taken into account. To this end the dedendum circle of operation 27, limiting towards the root the ideal active or working zone of the outline beginning at the tooth addendum, is used for determining the diameter of a circle 28 limiting by intersection with the outline the zone to be rolled, in order to reserve a safety margin or interference clearance, the value of this clearance being about 0.04 time the module, the diameter of circle 28 being determined from the diameter of said circle 27 calculated or measured by deducting therefrom twice the value of said clearance. On the other hand and as explained hereinabove in connection with the circle 25 constituting the geometric envelope of the tooth addendum outline of the conjugate pinion, the tooth dedendum circle 26 is determined with due consideration of the theoretical operating clearance 24 which it is desired to preserve at this root between the pinion 16 and the conjugate pinion 17. This operating clearance, according to a specific feature of this invention, is limited to a maximum of 0.15 times the module of the pinion, in contrast to a value of about 0.25 to 0.30 time the module, heretofore, this difference setting in sharp relief one of the advantageous features of this invention.

Figure 7:
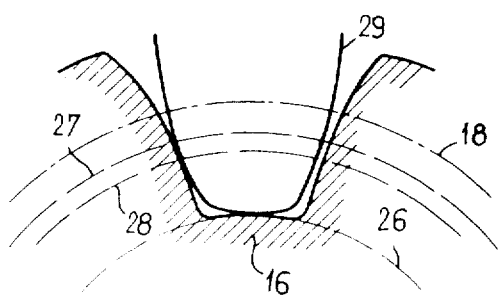
FIG. 7 is a similar diagram showing the gear and the corresponding wheel.

Therefore, the wheel outline is so selected that the envelope of its tooth addendum 19 be tangent to the circle 26 and that on the other hand its working portion performing the rolling operation proper remains in meshing contact with the tooth of the workpiece up to the above-defined circle 28 (FIG. 7).

These two features determining the wheel tooth outline (which on the other hand is determined by the known envelope method) is complemented by another advantageous if not necessary feature concerning the number of teeth of the wheel.

It is known that the useful life of the wheel, and also its overall dimensions in relation to the workpiece, increase with the teeth number. These two conditions are adhered to if the following unequality:

$$2n_1 < n_2 < 3n_1$$

is observed between the teeth number $n_1$ of the workpiece and the teeth number $n_2$ of the wheel.

If the wheel has a defect on one tooth, or is out of true, a homologue defect is reproduced on the piece worked by the wheel inasmuch as one tooth of said wheel engages several times a given hollow in the teeth of the workpiece during the rolling operation. Between $n_1$ and $n_2$ there is the relationship :

$$n_2 = n_1 + P \text{ (P being an integer)}$$

that is :

$$n_1 = Q \, r_1$$

and $P = Q \, r$ ($r_1$ being integers and $Q$ also integer being the highest common factor of $n_1$ and $P$)

When $Q = 1$, i.e. if $n_1$ and $P$ are prime numbers to each other, a wheel tooth falls into the same hollow of the workpiece after $n_1 \, P_2$ full revolutions of the wheel.

Therefore, the optimum requirement for avoiding the recurrence of same defects in a same impression and therefore shape asymmetries is that the teeth number of the workpiece and the difference between the teeth numbers of the workpiece and of the wheel be prime numbers to each other, or alternately that the lowest common multiple of $n_1$ and $n_2 - n_1$ be greater than the number of revolutions of the wheel during the finishing operation.

Although the present invention has been described with reference to specific forms of embodiment thereof, it will readily occur to those conversant with the art that various modifications and changes may be brought thereto by those skilled in the art without departing from the basic principles of the invention as set forth in the appended claims.

What is claimed as new is:

1. A method of finishing gear teeth including a gauging operation of the inoperative surfaces of a gear, which surfaces are not brought into mutual contact during operation of a gear, comprising flattening ridges of the uneven surfaces of a rough cut gear by rolling in mesh with the rough cut gear a rolling tool the outline of which is a conjugate outline of the desired resultant finished gear, the outer diameter of the tool teeth addendum being equal to the external diameter of a conjugate pinion increased by twice the root clearance required for gear operation, said clearance being not greater than about 0.15 times the conjugate pinion module, said rolling continuing until the tool and gear mesh and roll at a limit located within the working circle of the service dedendum by a radial distance corresponding to the distance corresponding to the clearance necessary for absorbing service interferences.

2. A method according to claim 1, wherein the number of teeth of the rolling tool and the difference in the teeth numbers of the gear and rolling tool are prime numbers to each other.

3. A method according to claim 1, wherein the rolling tool has a teeth number ranging from twice to three times the number of teeth of the gear to be rolled.

4. A method according to claim 1, wherein the number of revolutions of the tool during the rolling operation is less than the lowest common multiple of the number of teeth of the gear and of the difference between the numbers of teeth of said tool and gear.

* * * * *

UNITED STATES PATENT OFFICE
CERTIFICATE OF CORRECTION

Patent No. 3,673,837            Dated July 4, 1972

Inventor(s) Michel TIXIER

It is certified that error appears in the above-identified patent and that said Letters Patent are hereby corrected as shown below:

Letters Patent reflect French Priority
No. 69/19 906 filed June 16, 1969

Signed and sealed this 30th day of January 1973.

(SEAL)
Attest:

EDWARD M. FLETCHER, JR.            ROBERT GOTTSCHALK
Attesting Officer                    Commissioner of Patents